United States Patent [19]

Ludin et al.

[11] 4,211,092

[45] Jul. 8, 1980

[54] SPACE HEATING INSTALLATION

[76] Inventors: Ludwig Ludin, Kesselackerweg, CH 5611 Anglikon-Wohlen, Switzerland; Nikolaus Laing, Hofener Weg 37, D 7148 Remseck 2; Oliver Laing, Hofener Weg 37, D 7148 Remseck 2; Karsten Laing, Hofener Weg 37, D 7148 Remseck 2, all of Fed. Rep. of Germany

[21] Appl. No.: 943,289

[22] Filed: Sep. 18, 1978

[30] Foreign Application Priority Data

Sep. 22, 1977 [AT] Austria ................................. 6810/77
Sep. 22, 1977 [AT] Austria ................................. 6811/77

[51] Int. Cl.² ............................................. F25B 3/00
[52] U.S. Cl. .................................................... 62/499
[58] Field of Search ................................ 62/402, 499

[56] References Cited

U.S. PATENT DOCUMENTS

| | | | |
|---|---|---|---|
| 3,347,059 | 10/1967 | Laing | 62/499 |
| 3,696,634 | 10/1972 | Ludin et al. | 62/499 |
| 3,797,270 | 3/1974 | Laing et al. | 62/499 |
| 3,877,515 | 4/1975 | Laing | 62/499 |
| 3,973,622 | 8/1976 | Laing | 62/499 |
| 4,000,777 | 1/1977 | Laing | 62/499 |
| 4,000,778 | 1/1977 | Laing | 62/499 |
| 4,131,157 | 12/1978 | Laing | 62/499 |

*Primary Examiner*—Ronald C. Capossela
*Attorney, Agent, or Firm*—Pennie & Edmonds

[57] ABSTRACT

A heat pump having a rotatable casing and impeller. The pump includes a liquid heat exchanger and an air heat exchanger both connected to the casing so as to form a rotatable unit therewith. A magnetically active rotor is magnetically coupled to the inpeller to provide a drive force for the pump. Rotation of the impeller causes the casing and heat exchanger to also rotate under the influence of reaction forces.

19 Claims, 7 Drawing Figures

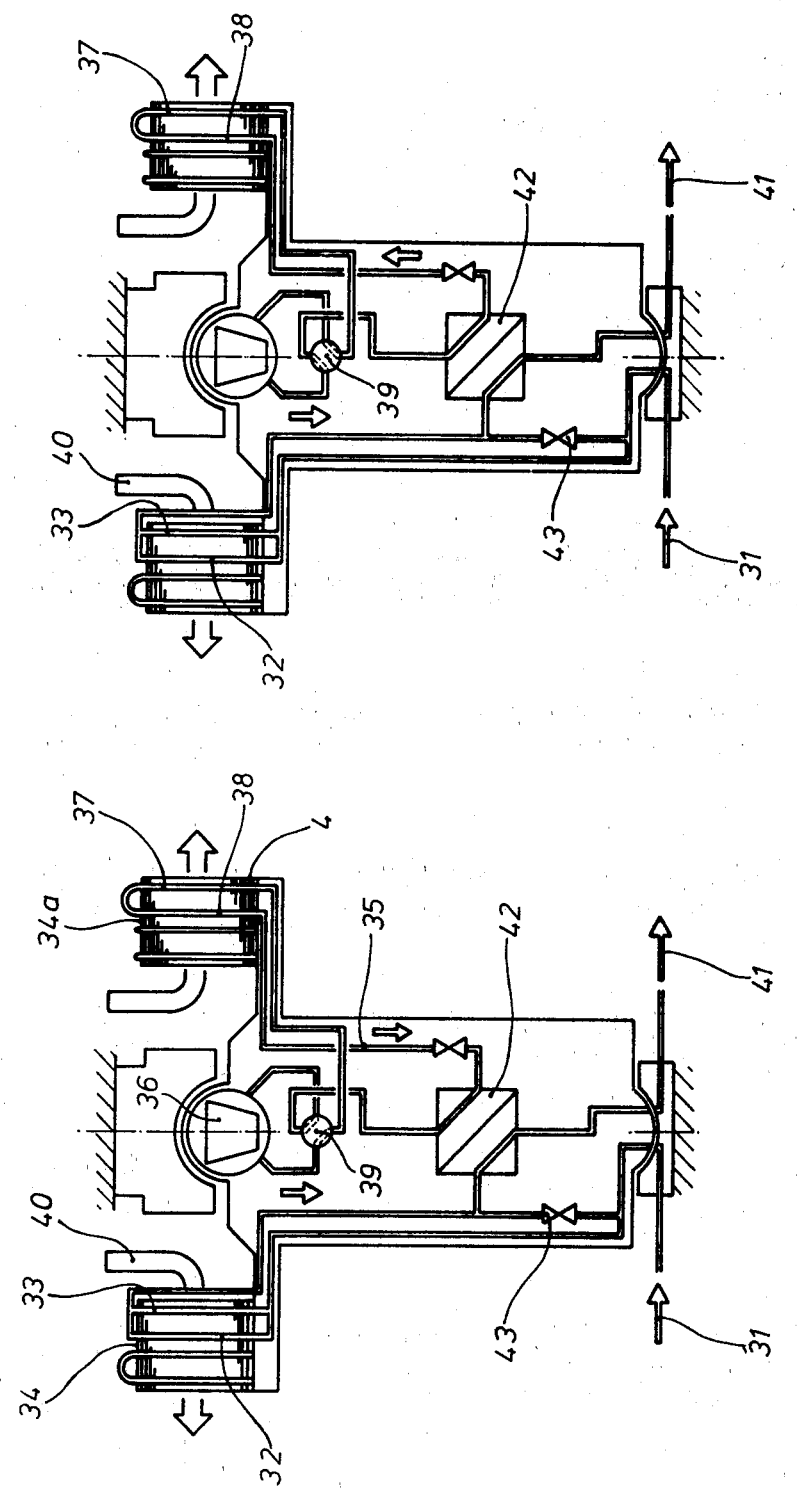

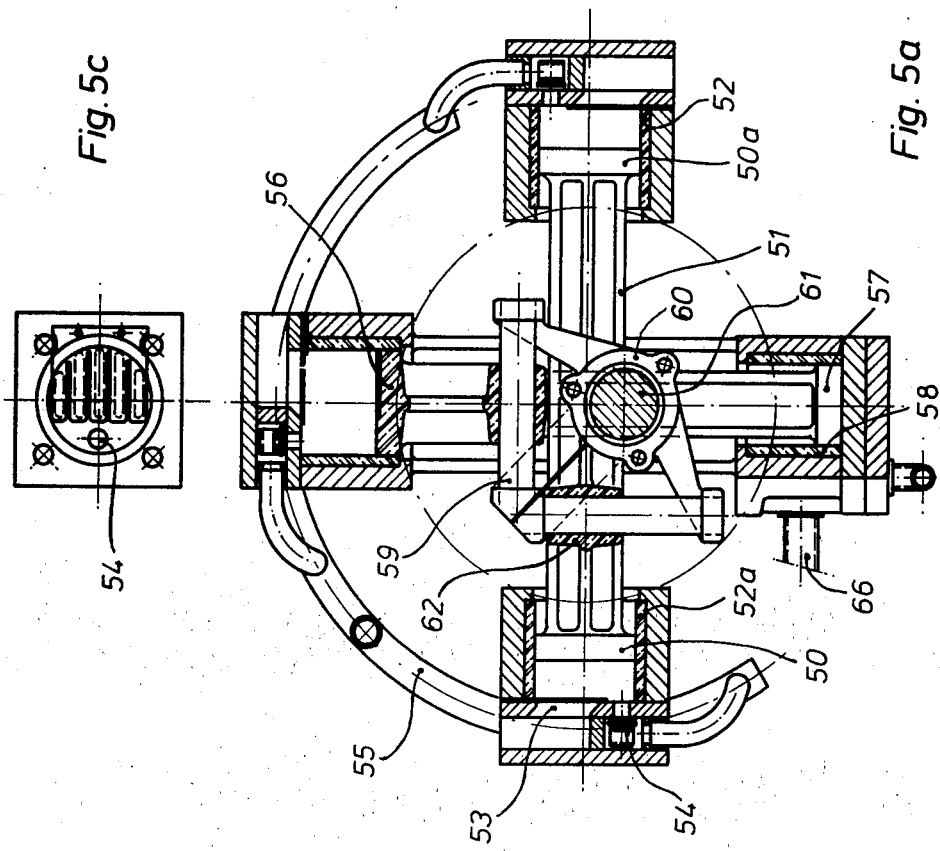
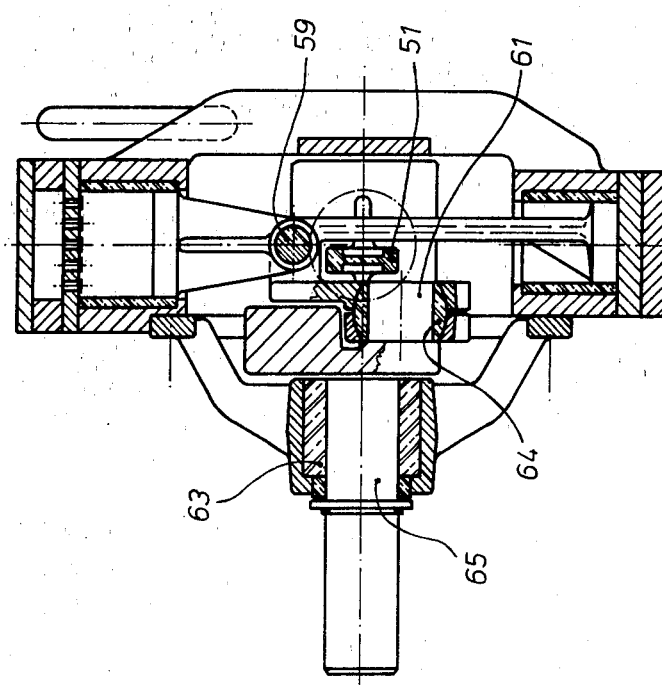

SPACE HEATING INSTALLATION

TECHNICAL FIELD

The invention relates to heat pumps serving as substitution for central heating boilers heated with fossil fuel.

BACKGROUND OF THE INVENTION

Many suggestions have been made to use heat pumps for space heating. The effectiveness on an annual basis of all known heat pumps is however so low that they do not achieve a heating cost lower than that achieved by burner-operated heating devices.

The aim of the invention is to devise a heating system operated by heat pumps which does not have this disadvantage but can compete, as regards heat cost, with coal, oil or gas heated heating devices and which requires practically no maintenance.

The invention takes into consideration requirements to be met when the heat pump is to be substituted to a large extent for heating devices operated by burners. These requirements are:

1. A heat pump to be installed in a flat, should operate noiselessly. The noise of fans is not determined by the speed or air needed for heat exchange but by the speed of air needed to blow away the condensate being formed.
2. A heat pump installation should require practically no maintenance.
3. The temperature difference between the available and required heat should be as small as possible.
4. The efficiency of the heat pump should be as high as possible.
5. The working life should, as far as possible, be the same as that of heating boilers.

The invention relates to heat pumps which meet these requirements.

GENERAL DESCRIPTION OF THE INVENTION

According to the invention the compressor of a heat pump is driven by a rotating magnetic pole ring which is hermetically enclosed by a magnetically pervious separation wall from a drive producing rotating field, the stator part of the compressor being rotatably mounted and forming a unit with a rotating air heat exchanger.

Such compressor fan units are known but their disadvantage is that the mounting of the rotatable compressor heat exchanger unit cannot be enclosed in a hermetically sealed space so that these machines have bearings which require maintenance and, due to high machine weight and unavoidable vibration forces are subjected to high bearing loads and consequently noisy.

According to the invention the heat pump communicates with air and also with a liquid heat carrier. The liquid heat carrier would normally require that, in addition to bearings requiring maintenance, use of a pipe sealing means. The invention provides a mounting which does not require maintenance and which at the same time acts as a pipe seal. This is formed according to the invention by an approximately hemispherical bearing shell and a convex spherical bearing part movable relative thereto. This unit forms at the same time an opening for the pipe, while the liquid heat carrier (generally water, and consequently hereinafter referred to as water) provides at the same time lubrication to the bearing parts. A film is formed hydrodynamically by suitable grooves, the film ensuring contactless operation of the bearing. Due to swivelling of the bearing parts relative to each other all bearing twisting forces are avoided.

A stable operation is achieved according to the invention in that the centre of the bearing is positioned above the centre of gravity of the machine formed by the rotating unit and the motor. Preferably non-metallic materials of exceptionally high hardness and small coefficient of thermal expansion, such as aluminum oxide, silicon nitride and particularly silicon carbide (these materials are hereinafter referred to as hard materials) are used as materials for the elements of the bearing in sliding contact. This prevents wearing down of bearing surfaces at high revolution or also when hard dirt particles from the water get into the bearing gap, and in addition the gap width remains constant which is of great importance for the sealing function of the bearing, which also serves as a sealing means for the pipe.

The part of the rotating unit which lies below the centre, consists substantially of heat exchangers. The heat exchangers are arranged between the working medium and the water along the periphery of the rotating heat exchanger below the area of the air heat exchanger.

The air heat exchanger is according to the invention made in such a way that, starting from the inner diameter, a pipe ring passes therethrough through which water flows and then at a larger diameter there is provided a pipe ring through which the working medium flows. This ensures that when the air heat exchanger is to receive heat, it transfers that part of the available heat, the temperature of which lies above the temperature of condensation, directly to the water, whilst bypassing the heat pump. So far as the reverse heat cycle is concerned when heat is removed from the water, the arrangement insures that that part of the heat, the temperature of which lies above the temperature of the air entering the heat exchanger, is transmitted by heat exchange to the air stream.

Means for further improvement of the effectiveness and consequent reduction of the drive power necessary to operate the heat pump comprises in providing means by which the expansion forces which arise when the pressure drops, brings the condensate from the condenser level to the evaporator level is used to provide useful expansion work.

An expansion displacement motor is used for recovering the expansion work. This motor is designed as a compressed air motor and its output is fed back to the compressor. Compressed air motors require however oil lubrication. As provided by the invention, a backing liquid flows into the expansion motor of a heat pump instead of a gas. This would dissolve an oil film, so that lubrication with oil is not possible. It is therefore arranged according to the invention that the working medium itself is used as a lubricant. This is possible, according to the invention, when the parts of the expansion motor, which are in mutual sliding contact, are made from a hard material, particularly from silicon carbide.

Further improvement of the effectiveness on an annual basis is achieved by making the elements in sliding contact of in the compressor and possibly also the elements in sliding contact in the bearing from the same hard material. This avoids the use of oils, which cause significant shearing stresses. Due to the negligible thermal expansion the sealing gaps between the elements in sliding contact remain constant so that sealing and lubrication is performed by the working medium or by a low-viscous liquid, added to the working medium, the boiling point of that liquid being higher than that of the working medium. This arrangement is not limited to the compressor for rotating heat pumps but can be used for all displacement machines.

A further improvement of the effectiveness is possible, according to the invention, in that the roofing of a building or also the returning medium of a district heating network is used as a source of heat, and that also one, or preferably two latent heat accumulators cooperate with the heat pumps.

BRIEF DESCRIPTION OF THE DRAWINGS

FIG. 1b is a partial broken plan view of the pump of FIG. 1a;

FIG. 2 is a partial enlarged plan view of a bearing shell utilized in the pump of FIG. 1a;

FIG. 3 is a diagrammatic view of a heat pump constructed according to the invention used for space heating;

FIG. 4 is a diagrammatic view of a heat pump constructed according to the invention used for cooling;

FIG. 5a is a cross-section of a modified form of a compressor and an expansion motor used in the heat pump of FIG. 1a;

FIG. 5b is an axial sectional view of the compressor of FIG. 5a; and

FIG. 5c is an end view of a valve used in the compressor of FIG. 5a.

BEST MODES FOR CARRYING OUT THE INVENTION

Figure 1A:
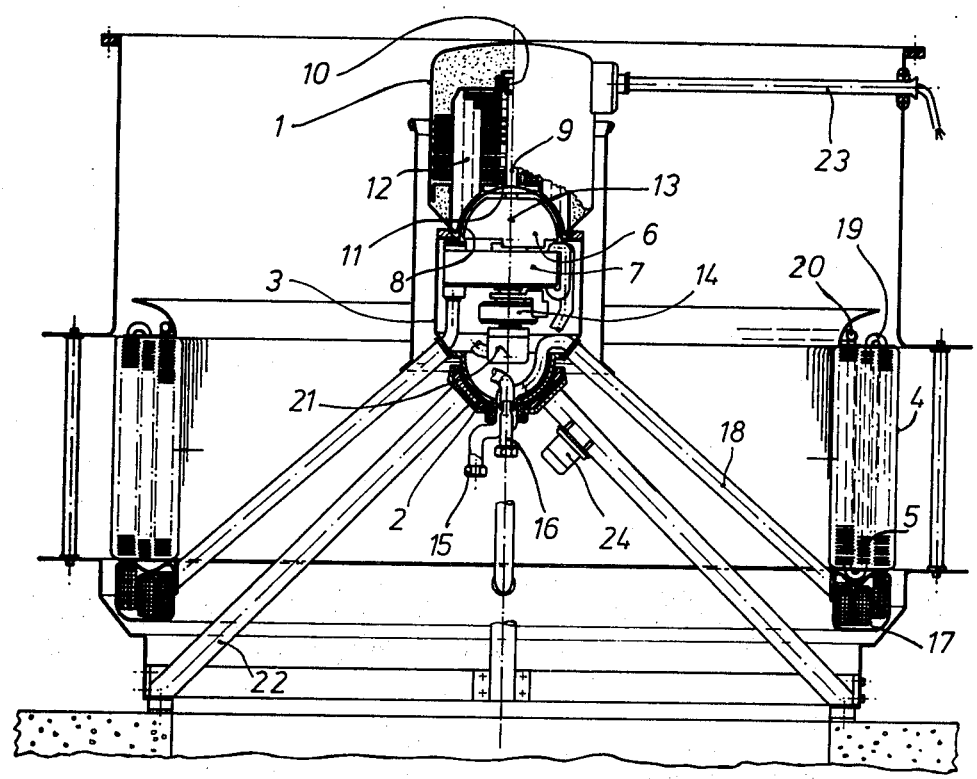
FIG. 1a is a cross-sectional view of a heat pump constructed according to the invention.

FIG. 1a shows diagrammatically the design of a heat transfer heat pump according to the invention in section. A heat pump casing 3 is arranged between a non-rotatable motor stator 1 and bearing shell or bushing 2 of a hydrodynamic bearing lubricated by water and serving at the same time as a sealing element. The casing 3 forms with the rotatable heat exchanger 4 a rotatable unit. The motor rotor 6 drives an impeller of the compressor 7 relative to a non-movable reference system e.g. at 3,000 rpm. The torque is transferred to the rotating unit 3, 4 above the casing of the compressor 7. The heat exchanger 4 acts as a shearing strain fan and its torque is increased with the square of the rotational frequency, so that a rotational frequency of e.g. 300 rpm relative to a non-movable reference system is obtained. A relative rotational frequency of 2,700 rpm is obtained in this way between the compressor casing and the compressor rotor 6. The bearing shell 2, which is subjected to the weight of the rotating unit 3, 4 and which serves at the same time as a pipe sealing means, does not require any maintenance, because it is lubricated by water. A shaft 9 is mounted at one end to the highest point of a sphere of the magnetically pervious calotte shaped separation wall. The shaft 9 is connected via bearings 10 and 11 to the stator 1 so that an air gap is defined between the sheet iron teeth 12 of the motor and the magnetically pervious separation wall 8 independently of the position of the axis 13 of rotation. On the shaft of the compressor motor is also attached the rotor of the expansion motor 14. Expansion motor 14 serves to recover the expansion work of the condensed work medium. Liquid heat carrier flows out the lowest point of the calotte-shaped bearing shell 2 through the pipes 15 and 16. The heat exchange between water and working medium takes places in a heat exchanger 17, which is connected by a pipe 18 with the casing 3. These pipes serve at the same time as spokes between the casing 3 and the rotating heat exchanger 4. The liquid heat carrier flows the inner space 20 of the heat exchanger 4 while a working medium flows, through the outer space 19 flows. The swivel centre 21 of the rotating unit 3, 4 lies above the centre of gravity, so that the rotating unit requires only a single spherical bearing. The bearing shell 2 is supported by props 22. The motor stator 1 is prevented from rotation due to its reaction moment by a lever arm 23. An electromagnetic vibrator 24 ensures, when the motor is switched on, that the static friction in the bearing shell 2 is overcome. The motor is preferably made in such a way that it may be driven with two poles, or, by switching of the coils, also e.g. with 16 poles. When the whole available heat has a temperature which lies above the temperature of the heat required by the heat pump, the rotating unit 3, 4 is driven by a 16-pole winding. The compressor rotor then rotates very slowly or even remains stationary, the rotational frequency of the rotating unit 3, 4 continues thereby to remain approximately at 300 rpm. The apparatus acts then only as a heat exchanger.

Figure 1B:
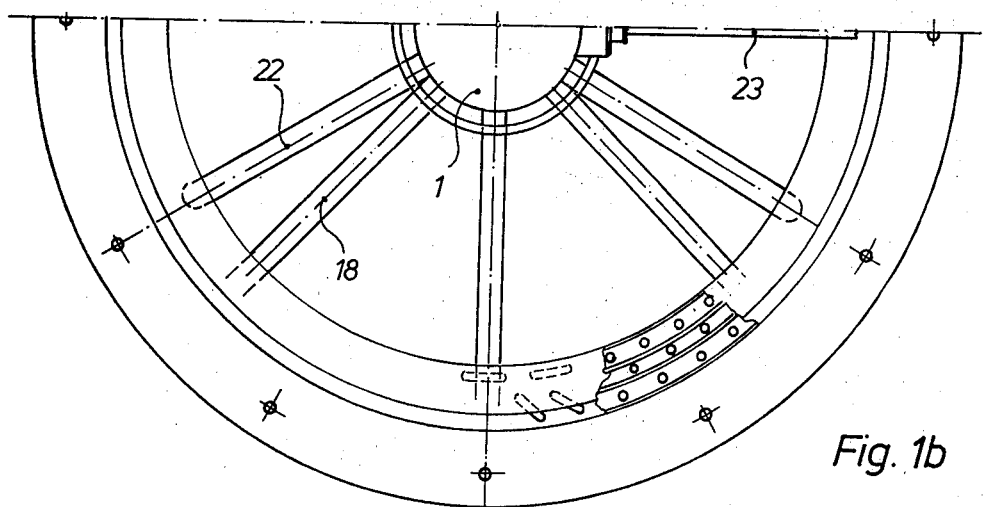

FIG. 1b is a plan of the heat pump according to FIG. 1a, the parts of the pump having the same references as were used in FIG. 1a.

Figure 2:
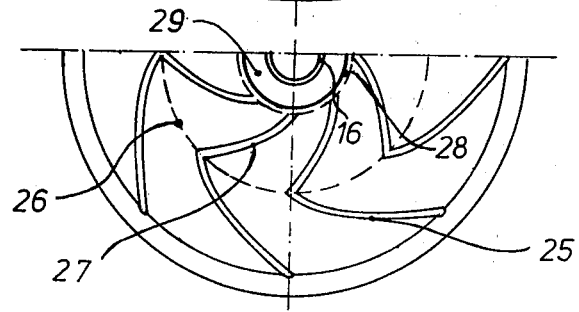

FIG. 2 shows a stationary bearing shell 2, the rotating unit 3, 18, 4 having been removed. The pipe 16 can be seen in the middle. At the ring gap 29 is connected the pipe 15. After that follows a sealing ring area 28. Then follow spiral grooves 27 which extend in the direction of rotation and end at the intermediate diameter 26 where also end the spiral grooves 25 proceeding from outside. Due to this, hydrodynamic pressure is built in the area of this diameter 26, the pressure causing contactless mounting.

FIG. 3 is a diagram of connections of a heat pump according to the invention for heating of air in space. A first part of the heat, e.g. of the return medium of a district heating system is transferred to the space air 40 from a water stream 31 by pipe rings 32 and 33 which pass through the ring ribs 34, 34a of a rotating heat exchanger. On being cooled from 40° C. to 32° C. the water flows to a heat exchanger 42 which serves as evaporator for the working medium circuit 35, and is there further cooled down to 17° C. The compressor 36 compresses the gaseous working medium. The condensation takes place in the pipe rings 37 and 38 of the rotating heat exchanger 4. The heat carrying water leaves the circulation pump finally at 20° C. in the direction of the arrow 41. FIG. 4 shows the same rotating heat pump which however, by switching over of a 4-way valve 39, is operated with a counter-current working medium circuit for the purpose of water heating. This direction of flow of the heat pump is selected when e.g. the space air 40 is to be cooled. In that case the valve 43 is open when the temperature of water, entering in the direction of the arrow 31, lies above the temperature of the space air. This connection may also serve for receiving heat, e.g. when air 40 is sucked in from a solar collector. This air then heats the water circuit 31, which enters e.g. at a temperature of 35° C. in the pipes 32 and 33, up to a temperature of e.g. 40° C. Then the heated water flows from the heat exchanger 42, which now works as a condenser, and is then heated up to a temperature of 45° C., and is supplied in the direction of the arrow 41 to a system to be heated, e.g. a latent heat accumulator. If the temperature of air according to the arrow 40 is below the temperature of the water returning according to the arrow 31, the valve 43 is opened.

FIG. 5a is an axial section of a modified form of a compressor and expansion motor than that of compressor 7 and motor 14 of FIG. 1a.

The pistons 50 and 50a which are the equivalent of the impeller of the compressor form, together with a rod 51, an oscillating unit made from hard material. The cylinder liners 52 and 52a which are the equivalent of the casing of the compressor 7 are also made from hard material. The inlet valve 53 is shown in FIG. 5c in section. The outlet valve 54 communicates with a collector 55. The piston 56 of the third cylinder forms with the piston 57 of an expansion motor, the cylinder 58 of which has a smaller diameter than that of the cylinder 52, a second oscillating unit. The oscillating movement is generated by sliding bars 59, which extend at right-angles to each other and which are reciprocated via a bearing bush 60 by a crank pin 61. The sliding bars 59 slide in openings 62 and are also made of hard material. Also the bearings 63 and 64 and the crank shaft 65 are made of hard material. A positively controlled valve is provided in the expansion cylinder 58 which allows the condensate to enter inside the cylinder, until about 20% of the cylinder has been filled. Work is gained in this cylinder by partial evaporation. Then the mixture, consisting of condensate and vapour, leaves the cylinder through the opening 66 and flows into the evaporator.

A further step of the invention consists in that water, leaving in the direction of the arrow 41 in FIG. 4, is guided through an accumulator the accumulation mass of which consists of a meltable substance, the melting point of which lies only slightly below the outlet temperature of the water flowing as shown by the arrow 41, and only slightly above the circuit temperature of the heat giving circuit, e.g. of a central heating.

We claim:

1. A heat pump comprising a compressor having a rotatable casing and a rotatable impeller; a liquid heat exchanger and an air heat exchanger combined with said rotatable casing to form a rotatable unit; a bearing rotatably mounting said rotatable unit with the center of gravity of said unit being located above said bearing; a magnetically active rotor connected to said impeller; a stator spaced from and providing a drive torque to said rotor whereby when said rotor is rotated, said unit will rotate by the reaction moment of said impeller; and a magnetically pervious separation wall situated between said stator and said rotor.

2. A heat pump according to claim 1 wherein said bearing comprises a first bearing element having a convex spherical surface connected to said rotatable unit and a second bearing element having a concave spherical surface.

3. A heat pump according to claim 2 including a bearing gap between the spherical and convex surfaces which forms a sealing gap of a liquid tight through-passage.

4. A heat pump according to claim 2 wherein the bearing elements comprise a hard material.

5. A heat pump according to claim 2 wherein one of said bearing surfaces has an inner opening and grooves located in the vicinity of an annular area of the surface situated between the inner opening and the periphery of the surface.

6. A heat pump according to claim 1 wherein said liquid heat exchanger is positioned below said air heat exchanger.

7. A heat pump according to claim 1 having in addition a shaft connected to said separating wall and being coaxial with said stator.

8. A heat pump according to claim 1 wherein the air heat exchanger is connected with said casing by pipes in the form of wheel spokes.

9. A heat pump according to claim 8 wherein the stator has two windings whereby the rotational frequency of said rotor may be varied.

10. A heat pump according to claim 9 in which circulating water passes initially through the radially innermost pipe means of the air heat exchanger and then through a liquid heat exchanger adapted to thermally communicate with a working medium.

11. A heat pump according to claim 1 wherein said air heat exchanger comprises a radial succession of a plurality of pipes passing through ribs with the radially innermost of said pipes being adapted to receive water.

12. A heat pump according to claim 1 wherein said liquid heat exchanger is adapted to receive a working medium and having in addition an expansion displacement motor adapted to receive the working medium having slidable elements in contact with one another where said elements are made of a hard material.

13. A heat pump according to claim 12 where said expansion displacement motor has an inlet valve the opening of which is synchronized to allow a specific amount of condensate of the working medium to enter said motor.

14. A heat pump according to claim 13 wherein said expansion displacement motor includes a piston slidable in a cylinder.

15. A heat pump according to claim 1 wherein said compressor has a cylinder and a piston slidable in said cylinder with both the piston and cylinder being made of a hard material.

16. A heat pump according to claim 15 wherein a liquid is used as a lubricant in said compressor where said lubricant is as viscous as water, is soluble in the working medium passing through said compressor and has a boiling point above the boiling point of the working medium.

17. A heat pump according to claim 15 wherein said compressor has two cylinders arranged opposite each other, a piston slidable in each cylinder with the pistons being connected to a bar and a slide rod passing through an opening in said rod.

18. A heat pump according to claim 17 wherein said compressor has two rail slide rods arranged at right angles to each other and forming a unit with a bearing bushing which is mounted on a crank pin of a crank shaft.

19. A heat exchanger according to claim 1 having in addition a meltable storage substance associated with a heat exchanger wherein the melting point of said substance is slightly below the temperature of water flowing from a condensor and slightly above the temperature of the system to be heated.

* * * * *

UNITED STATES PATENT AND TRADEMARK OFFICE
CERTIFICATE OF CORRECTION

PATENT NO. : 4,211,092

DATED : July 8, 1980

INVENTOR(S) : Ludin et al.

It is certified that error appears in the above—identified patent and that said Letters Patent are hereby corrected as shown below:

Claim 1, line 6, change "above" to --below--;

Signed and Sealed this

Nineteenth Day of May 1981

[SEAL]

Attest:

RENE D. TEGTMEYER

*Attesting Officer*   *Acting Commissioner of Patents and Trademarks*